Oct. 22, 1946.    R. W. HAASE    2,409,625
SEPARATOR
Filed Nov. 26, 1942    2 Sheets-Sheet 1

INVENTOR
ROBERT W. HAASE
BY
ATTORNEY

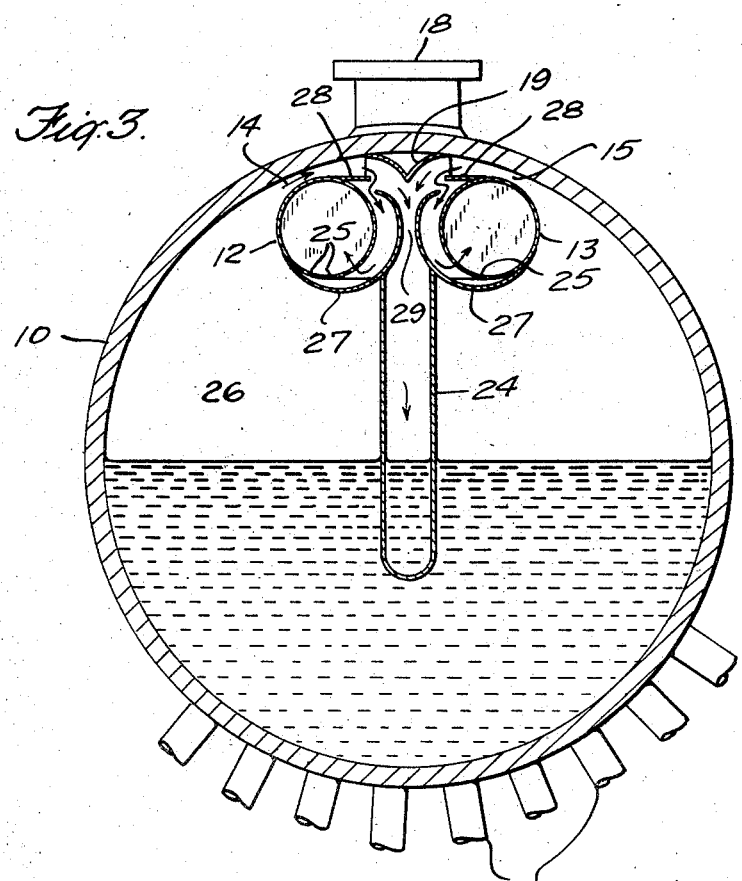
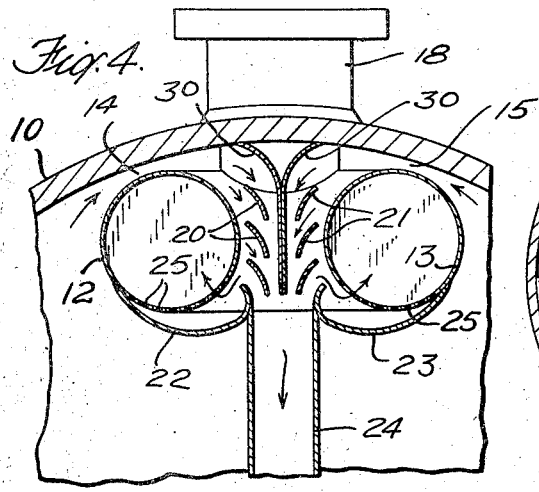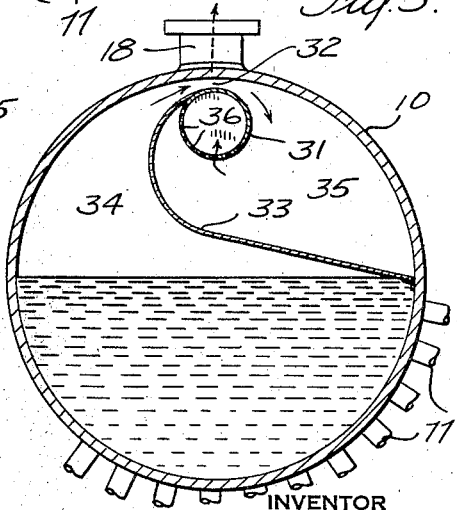

Patented Oct. 22, 1946

2,409,625

UNITED STATES PATENT OFFICE 2,409,625

SEPARATOR

Robert W. Haase, Westfield, N. J., assignor to Foster Wheeler Corporation, New York, N. Y., a corporation of New York Application November 26, 1942, Serial No. 467,071

10 Claims. (Cl. 183—83)

This invention relates to separators and more particularly pertains to the separation of substances of different specific gravity from mixtures thereof.

The invention will be disclosed as embodied in apparatus for the separation of steam and water from a mixture of the same, but it will be understood that the invention is not limited thereto but is capable of application generally to the separation of substances of different specific gravity from mixtures of such substances.

The invention will be understood from the following description when considered in connection with the accompanying drawings forming a part thereof, and in which:

Fig. 3 is a view similar to Fig. 1 showing another form of the invention;

Fig. 4 is a partial transverse sectional view of a steam drum having another form of separating apparatus embodying the invention, and Fig. 5 is a view similar to Fig. 1 showing a further form of the invention.

Like characters of reference refer to the same or to similar parts throughout the several views.

Figure 1:
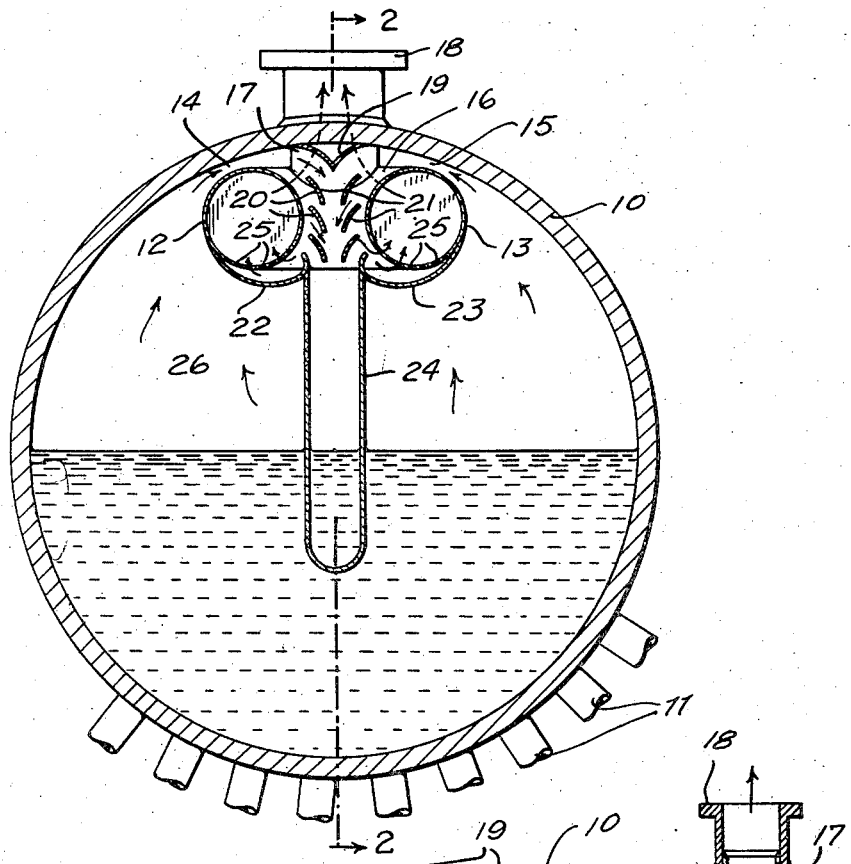
Fig. 1 is a more or less diagrammatic view, in transverse section, of a steam and water drum of a steam generator, having separating apparatus embodying the invention.
Figure 2:
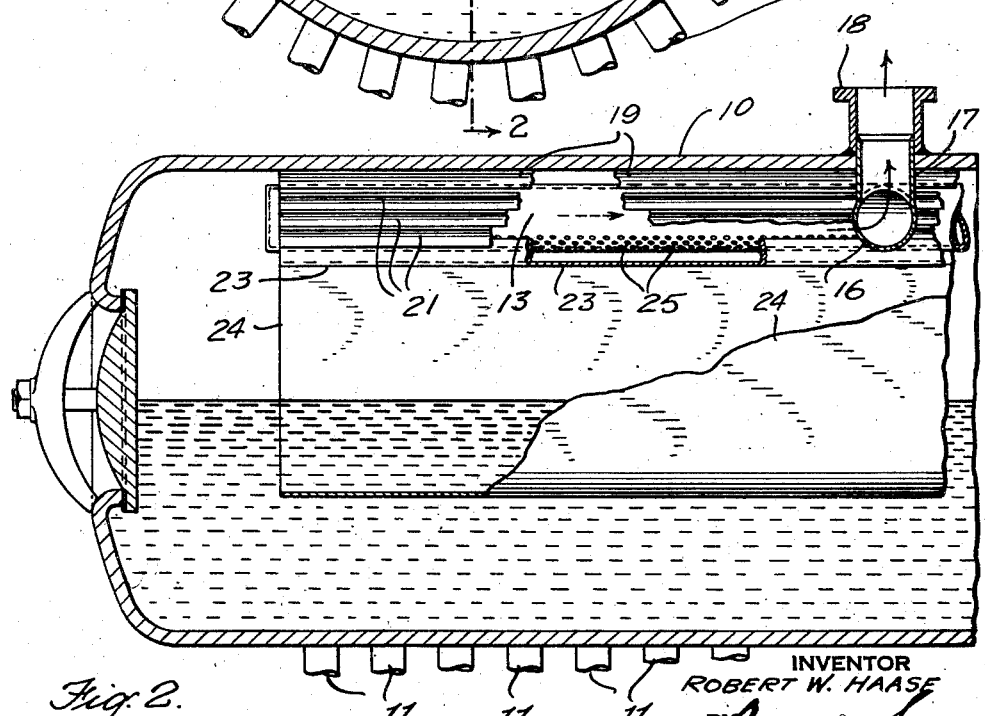
Fig. 2 is a longitudinal sectional view, on a reduced scale, taken on line 2—2 of Fig. 1.

Referring to Figs. 1 and 2 of the drawings, reference character 10 designates a steam and water drum of a steam generator having a bank of steam generating tubes 11 connected at their upper ends to the lower portion of the steam drum. The drum has two dry pipes 12 and 13 which are disposed within the drum in the upper portion thereof on opposite sides of a vertical plane passing through the longitudinal axis of the drum and closely adjacent to the inner wall of the drum to provide passages 14 and 15 respectively. The dry pipes are connected together at their central portions by a transverse connecting pipe 16 which has a vertically extending pipe 17, the upper end of which connects with a steam nozzle 18 extending from the upper central portion of the drum 10.

A V-shaped baffle 19 with concavo-convex legs, has the upper ends of its legs secured to the inner wall of the drum above the dry pipes 12 and 13, and with its apex in the vertical longitudinal plane passing through the longitudinal axis of the drum. Vertical rows of vertically spaced, horizontal baffles 20 and 21, extend longitudinally of the drum between the dry pipes and on opposite sides of the aforesaid plane and in spaced relationship thereto and to the dry pipes. Each of these baffles 20 and 21 is concavo-convex in transverse cross-sectional configuration, with the concave side facing the dry pipe adjacent to which it is disposed, and with its transverse axis inclined to the vertical upwardly and outwardly from the aforesaid plane. Baffles 22 and 23, generally U-shaped in cross-sectional configuration, are disposed below the dry pipes 12 and 13 respectively, and each has the upper end of its outer leg secured to the lower portion of the adjacent dry pipe and the upper end of the inner leg spaced from the lower portion of the dry pipe, as shown. A U-shaped member 24, extending for substantially the length of the dry pipes and with the upper ends of the legs thereof secured to the inner portions of the baffles 22 and 23, and with its lower portions disposed at an elevation below the normal water level in the drum, provides a drain trough for the water separated from the steam and water mixture. Each dry pipe has a plurality of spaced apertures 25 in its lower portion, within the area included between the legs of the U-shaped baffle 22 or 23.

In operation, a mixture of steam and water is delivered to the drum 10 through the steam generating tubes 11 and flows upwardly through the water in the drum, through the steam space 26 therein, and through the relatively narrow elongated passages 14 and 15 between the dry pipes 12 and 13 respectively, and the inner wall of the drum, after which it flows between the baffles 19 and 20 and between the baffles 20 on one side, and between the baffles 19 and 21 and between the baffles 21 on the other side. The steam and water mixture thus is directed in a curved path, which will cause the water in the mixture, due to centrifugal force, to flow into the space between the rows of baffles 20 and 21, and the steam to flow between the dry pipes and the row of baffles adjacent thereto. The water, thus separated from the mixture, will fall through the drain trough 24 and into the body of water in the bottom of the drum. The separated steam flowing through the passages between the dry pipes and the baffles 20 and 21, will flow into the U-shaped baffles 22 and 23 and after making an abrupt change in direction of flow, will pass through the apertures 25 into the dry pipes 12 and 13, through the connecting pipe 16 and through pipe 17 to the steam nozzle 18. With this arrangement, the water will be separated from the steam and water mixture, and substantially dry steam will flow into the dry pipe and from the steam nozzle 18.

The form of the invention shown in Fig. 3 is the same as the form shown in Figs. 1 and 2, excepting that in lieu of the baffles 20 and 21, each dry pipe 12 and 13 has a substantially semi-circular shaped baffle 27, disposed below the pipe and in the space between the pipes, with the outer edge of the baffle secured to the lower outer portion of the dry pipe and with the inner edge disposed adjacent to but in spaced relationship to the upper inner portion of the dry pipe, as shown. Each dry pipe also has a longitudinally extending baffle 28 which projects horizontally from the upper central portion of the dry pipe toward the baffle 19 but terminates short of the baffle 19. The portions of the baffles 27 which lie between the dry pipes, are spaced apart to provide a water passage 29. The operation of this form of the invention is substantially the same as the operation of the form shown in Figs. 1 and 2, excepting that after the steam and water mixture has passed through the passages 14 and 15, it is forced to make an abrupt change in direction of flow to enter the area between the inner ends of the baffles 27 and 28, thereby separating out water which will flow into the passage 29 and through the drain trough to the body of water in the drum. The steam flowing into the space between the dry pipes and the baffles 27, flows through these spaces and into the dry pipes through the apertures 25 therein, and into and through the steam nozzle 18.

The form of the invention shown in Fig. 4 is like the form shown in Figs. 1 and 2, excepting that the V-shaped baffle 19 is replaced by two baffles 30, which have vertically extending portions in contact with each other between the baffles 20 and 21 and have upwardly and outwardly curved portions above the baffles 20 and 21, the upper ends of which are secured to the inner wall of the drum. The operation of this form of the invention is substantially the same as the form shown in Figs. 1 and 2, excepting that the vertically extending portions of the baffles 30 will prevent the steam and water mixture flowing through the passage 14 from impinging upon the baffles 21 and flowing between these baffles into the space between the baffle 23 and the dry pipe 13, and similarly with respect to the mixture flowing through the passage 15.

In the form shown in Fig. 5, a single dry pipe 31 is employed in the upper central portion of the drum, adjacent the inner wall of the drum to provide a steam and water mixture passage 32. A single longitudinally extending baffle 33 of J-shape generally, has the upper end of the curved portion secured to the upper central portion of the dry pipe and the outer end of the plane portion secured to the inner wall of the drum at approximately the normal water level thereof. The baffle 33 divides the steam space of the drum into a chamber 34 and a chamber 35. In operation, the steam and water mixture flows into the chamber 34, through the passage 32, into the chamber 35, and downwardly therein until it is forced to make an abrupt change in direction of flow to enter the apertures 36 in the dry pipe. As shown, the apertures 36 are located in the lower portion of the dry pipe and in that portion which is adjacent the curved part of the baffle 33. With this arrangement, the water will be separated from the steam and water mixture when the mixture is forced to make an abrupt change in direction of flow in the chamber 35 in order for the steam to enter the dry pipe 31 through the apertures 36. The baffle 33 terminates short of the ends of the drum, and the water separated from the mixture in the chamber 35 flows to the ends of the baffle 33 and into the body of water in the drum.

The forms of the invention disclosed are preferred forms and changes may be made in the form, location and relative arrangement of the several parts of the apparatus disclosed without departing from the principles of the invention. In view thereof, it is understood that the invention is not to be limited excepting by the scope of the appended claims.

What is claimed is:

1. Apparatus for the separation of substances of different specific gravity from mixtures thereof, comprising means forming an enclosure into which a mixture of said substances is delivered, a plurality of tubular members in the enclosure disposed adjacent each other in spaced relationship and adjacent a wall of the enclosure and providing therewith a plurality of passages through which said mixture flows, baffle means secured to the wall of the enclosure and extending toward the space between the tubular members for directing the mixture flowing from said passages into said space, a plurality of substantially vertical rows of spaced baffles positioned in said space in the path of flow of the mixture directed into the space by said baffle means, each row being disposed adjacent a tubular member and spaced from another row, said mixture impinging against said baffle means and said baffle thereby separating the substances of lighter and heavier specific gravity, each tubular member having a plurality of apertures in the portion thereof remote from said wall and said rows of baffles, baffle means secured to each tubular member adjacent the apertured portion and extending in spaced relationship with said apertured portion for directing the separated substance of lighter specific gravity into said apertures, and a drain trough secured to the last mentioned baffle means.

2. Apparatus for the separation of substances of different specific gravity from mixtures thereof, comprising means forming an enclosure into which a mixture of said substances is delivered, a plurality of tubular members in the enclosure disposed adjacent each other in spaced relationship and adjacent a wall of the enclosure and providing therewith a plurality of passages through which said mixture flows, baffle means secured to the wall of the enclosure and extending toward the space between the tubular members but terminating short thereof for directing the mixture flowing from said passages into said space, a plurality of substantially vertical rows of spaced baffles positioned in said space in the path of flow of the mixture directed into the space by said baffle means, each row being disposed adjacent a tubular member and spaced from another row said mixture impinging against said baffle means and said baffle thereby separating the substances of lighter and heavier specific gravity, each tubular member having a plurality of apertures in the portion thereof remote from said wall and said rows of baffles, baffle means secured to each tubular member adjacent the apertured portion and extending in spaced relationship with said apertured portion for directing the separated substance of lighter specific gravity into said apertures, and a drain trough secured to the last mentioned baffle means.

3. Apparatus for the separation of substances of different specific gravity from mixtures thereof, comprising means forming an enclosure into which a mixture of said substances is delivered, a plurality of tubular members in the enclosure disposed adjacent each other in spaced relationship and adjacent a wall of the enclosure and providing therewith a plurality of passages through which said mixture flows, baffle means secured to the wall of the enclosure and extending toward and into the space between the tubular member for directing the mixture flowing from said passages into said space, a plurality of substantially vertical rows of spaced baffles positioned in said space in the path of flow of the mixture directed into the space by said baffle means, said mixture impinging against said baffle means and said baffle thereby separating the substances of lighter and heavier specific gravity, each row being disposed adjacent a tubular member and spaced from another row, each tubular member having a plurality of apertures in the portion thereof remote from said wall and said rows of baffles, baffle means secured to each tubular member adjacent the apertured portion and extending in spaced relationship with said apertured portion for directing the separated substance of lighter specific gravity into said apertures, and a drain trough secured to the last mentioned baffle means.

4. Apparatus for the separation of substances of different specific gravity from mixtures thereof, comprising means forming an enclosure into which a mixture of said substances is delivered, a plurality of tubular members in the enclosure disposed adjacent each other in spaced relationship and adjacent a wall of the enclosure and providing therewith a plurality of passages through which said mixture flows, baffle means secured to the wall of the enclosure and extending toward and into the space between the tubular members and in spaced relationship with each of said members, a substantially vertical row of spaced baffles positioned in each space between a tubular member and said baffle means in spaced relationship to both in the path of flow of the mixture directed into the space by said baffle means, said mixture impinging against said baffle means and said baffle thereby separating the substances of lighter and heavier specific gravity, each tubular member having a plurality of apertures in the portion thereof remote from said wall and said vertical row of spaced baffles, baffle means secured to each tubular member adjacent the apertured portion and extending in spaced relationship with said apertured portion for directing the separated substance of lighter specific gravity into said apertures, and a drain trough secured to the last mentioned baffle means.

5. Apparatus for the separation of substances of different specific gravity from mixtures thereof, comprising means forming an enclosure into which a mixture of said substance is delivered, at least one tubular member disposed adjacent a wall of the enclosure and providing therewith a passage through which said mixture flows, baffle means associated with said passage against which the mixture flowing from the passage impinges, means forming a path of flow for the mixture, said baffle being adapted to direct the mixture into the path of flow and substantially circumferentially of the tubular member, and a plurality of plates arranged adjacent said tubular member and extending axially thereof and disposed in said path of flow so that the mixture impinges thereupon separating substances of lighter and heavier specific gravity, the plates being spaced from the adjacent tubular member and from one another to provide passages therebetween, said tubular member having apertures remote from said wall and beyond said plates in the direction of flow of the mixture toward which apertures the separated substance of lighter gravity flows in said path of flow and enters.

6. Apparatus for the separation of substances of different specific gravity from mixtures thereof, comprising means forming an enclosure into which a mixture of said substance is delivered, at least one tubular member disposed adjacent a wall of the enclosure and providing therewith a passage through which said mixture flows, baffle means associated with said passage against which the mixture flowing from the passage impinges, means forming a path of flow for the mixture said baffle being adapted to direct the mixture into the path of flow and substantially circumferentially of the tubular member, a plurality of plates arranged adjacent said tubular member and extending axially thereof and disposed in said path of flow so that the mixture impinges thereupon separating substances of lighter and heavier specific gravity, the plates being spaced from said adjacent tubular member and from one another to provide passages therebetween, said tubular member having apertures remote from said wall and beyond said plates in the direction of flow of the mixture toward which apertures the separated substance of lighter gravity flows in said path of flow, and directing means associated with said tubular member in the portion thereof having said apertures for directing the lighter substance from the path of flow into the apertures.

7. Apparatus for the separation of substances of different specific gravity from mixtures thereof, comprising means forming an enclosure into which a mixture of said substance is delivered, at least one tubular member disposed adjacent a wall of the enclosure and providing therewith a passage through which said mixture flows, baffle means associated with said passage against which the mixture flowing from the passage impinges, means forming a path of flow for the mixture, said baffle being adapted to direct the mixture into the path of flow and substantially circumferentially of the tubular member, and a plurality of plates arranged adjacent said tubular member and extending axially thereof and disposed in said path of flow so that the mixture impinges thereupon separating substances of lighter and heavier specific gravity, said plates being concavo-convex in cross-section and disposed with the concave surface thereof toward the tubular member and spaced from said adjacent tubular member and from one another to provide passages therebetween, said tubular member having apertures remote from said wall and beyond said plates in the direction of flow of the mixture toward which apertures the separated substance of lighter gravity flows in said path of flow and enters.

8. Apparatus for the separation of substances of different specific gravity from a mixture thereof, comprising means forming an enclosure into which a mixture of said substance is delivered, at least one tubular member disposed adjacent a wall of the enclosure and providing therewith a passage through which said mixture flows, baffle means associated with said passage against which the mixture flowing from the passage impinges, means forming a path of flow for the mixture, said baffle being adapted to direct the mixture into the path of flow and substantially circumferentially of the tubular member, a plurality of plates arranged adjacent said tubular member and extending axially thereof and disposed in said path of flow so that the mixture impinges thereupon separating substances of lighter and heavier specific gravity, said plates being concavo-convex in cross-section and disposed with the concave surface thereof toward the tubular member and spaced from said adjacent tubular member and from one another to provide passages therebetween, said tubular member having apertures remote from said wall and beyond said plates in the direction of flow of the mixture toward which apertures the separated substance of lighter gravity flows in said path of flow and enters.

9. Apparatus for the separation of substances of different specific gravity from mixtures thereof, comprising means forming an enclosure into which a mixture of said substance is delivered, a plurality of tubular members in the enclosure disposed adjacent each other in spaced relationship and adjacent a wall of the enclosure and providing therewith a passage between a tubular member and the wall through which passage said mixture flows, baffle means associated with each tubular member against which the mixture flowing from said passage impinges, said baffle being adapted to direct the mixture in a path of flow substantially circumferentially of the tubular member with which the baffle is associated and into the space between adjacent tubular members, and a plurality of spaced plates arranged in a group adjacent each tubular member and extending axially thereof, the plates being disposed in said path of flow so that the mixture impinges thereupon separating substances of lighter and heavier specific gravity, the group of plates being spaced from each other and from the adjacent tubular member, said tubular members having apertures remote from said wall and beyond the plates in the direction of flow of the mixture toward which apertures the separated substance of lighter gravity flows in said path of flow and enters.

10. Apparatus for the separation of substances of different specific gravity from mixtures thereof, comprising means forming an enclosure into which a mixture of said substance is delivered, a plurality of tubular members in the enclosure disposed adjacent each other in spaced relationship and adjacent a wall of the enclosure and providing therewith a passage between a tubular member and the wall through which passage said mixture flows, baffle means associated with each tubular member against which the mixture flowing from said passage impinges, said baffle being adapted to direct the mixture in a path of flow substantially circumferentially of the tubular member with which the baffle is associated and into the space between adjacent tubular members, a plurality of concavo-convex plates, said plates being spaced from each other and arranged to extend axially of the tubular members in a group adjacent each tubular member with the concave surface thereof directed toward the adjacent tubular member, the plates being disposed in said path of flow so that the mixture impinges thereupon separating substances of lighter and heavier specific gravity, the group of plates being spaced from each other and from the adjacent tubular member, said tubular members having apertures remote from said wall and beyond the plates in the direction of flow of the mixture toward which apertures the separated substance of lighter gravity flows in said path of flow, and directing means associated with said tubular members in the portion thereof having the apertures for directing the lighter substance from the path of flow into the apertures.

ROBERT W. HAASE.